(12) United States Patent  (10) Patent No.: US 8,963,838 B2
King et al.  (45) Date of Patent: Feb. 24, 2015

(54) ENHANCED PROJECTED IMAGE INTERFACE

(71) Applicant: Texas Instruments Incorporated, Dallas, TX (US)

(72) Inventors: Philip S. King, Allen, TX (US); Gregory S. Pettitt, Farmersville, TX (US)

(73) Assignee: Texas Instruments Incorporated, Dallas, TX (US)

( * ) Notice: Subject to any disclaimer, the term of this patent is extended or adjusted under 35 U.S.C. 154(b) by 330 days.

(21) Appl. No.: 13/660,346

(22) Filed: Oct. 25, 2012

(65) Prior Publication Data

US 2013/0100019 A1    Apr. 25, 2013

Related U.S. Application Data

(60) Provisional application No. 61/551,038, filed on Oct. 25, 2011.

(51) Int. Cl.
G06F 3/033 (2013.01)
G06F 1/16 (2006.01)
G06F 3/03 (2006.01)
G06F 3/038 (2013.01)
G06F 3/0346 (2013.01)
G06F 3/0354 (2013.01)

(52) U.S. Cl.
CPC .............. *G06F 3/033* (2013.01); *G06F 1/1639* (2013.01); *G06F 3/0304* (2013.01); *G06F 3/0383* (2013.01); *G06F 3/0346* (2013.01); *G06F 3/03545* (2013.01)
USPC ......................................................... 345/158

(58) Field of Classification Search
None
See application file for complete search history.

(56) References Cited

U.S. PATENT DOCUMENTS

| | | | |
|---|---|---|---|
| 7,420,540 B2* | 9/2008 | Olbrich | 345/158 |
| 7,421,111 B2* | 9/2008 | Dietz et al. | 382/154 |
| 8,217,997 B2* | 7/2012 | Solomon et al. | 348/63 |
| 8,436,837 B2* | 5/2013 | Myers | 345/179 |
| 2007/0236451 A1* | 10/2007 | Ofek et al. | 345/157 |
| 2010/0001963 A1* | 1/2010 | Doray et al. | 345/173 |
| 2010/0110007 A1* | 5/2010 | Akimoto | 345/158 |
| 2012/0206349 A1* | 8/2012 | Nowatzyk et al. | 345/158 |

* cited by examiner

*Primary Examiner* — Jason Olson
(74) *Attorney, Agent, or Firm* — Jacqueline J. Garner; Frederick J. Telecky, Jr.

(57) ABSTRACT

An interactive display projection system, includes a pointing device which determines a location on the projected display indicated by the pointing device using a combination of a location signal in the display captured by the pointing device and optical mouse circuitry to determine motion of the pointing device when the pointing device is close to the projected display. In another embodiment, the pointing device also includes an inertial sensor and associated circuitry which detects linear accelerations and rotational rates to determine motion and orientation of the pointing device, which are also used to determine the location on the projected display indicated by the pointing device.

16 Claims, 3 Drawing Sheets

ENHANCED PROJECTED IMAGE INTERFACE

This application claims the benefit of Provisional Application No. 61/551,038, filed Oct. 25, 2011, the entirety of which is hereby incorporated by reference.

BACKGROUND

This relates to the field of display projection systems and, more particularly, to interactive display projection systems.

A display projection system provides a projected display, for example a front projected display on a vertical surface such as an opaque screen or a wall, or for example a rear projected display on an optically transmissive screen. Interactive display projection systems may allow a user to define or modify information in the projected display, for example using a keyboard or handheld remote input device. It may be desirable to have an interactive display projection system with pointing device which allows a user to indicate locations on the projected display and modify information in the projected display based on the indicated locations. It may further be desirable to update the indicated location of the pointing device in every frame of the projected display.

SUMMARY

An interactive display projection system which provides a projected display may include a pointing device. The display projection system may determine a location on the projected display indicated by the pointing device, using a combination of a location signal in the display captured by the pointing device and at least optical mouse optoelectronic elements and circuitry. The display projection system uses information from the optical mouse circuitry to determine an indicated position of the pointing device.

In a further embodiment, the pointing device may also include an inertial sensor and associated inertial sensor circuitry, in addition to the optical mouse. The inertial sensor detects linear accelerations and rotational rates along two or three axes and the inertial sensor circuitry determines motion and orientation of the pointing device. The display projection system uses information from the inertial sensor circuitry to determine an indicated position of the pointing device, for example when the pointing device is separated from the projected display so that the optical mouse cannot provide desired information.

A described example interactive display projection system includes a projector, the projector providing a projected display, wherein the projector provides a location signal in the projected display. A provided pointing device includes projected display location signal processing circuitry connected to a location signal sensor. The projected display location signal processing circuitry provides location signal detection information. The pointing device includes optical mouse circuitry connected to an optical mouse emitter and an optical mouse detector. The optical mouse circuitry provides relative motion information of the pointing device. The pointing device also includes transmit circuitry connected to a transmitter for sending information to the projector through the transmitter. Also included is projected display indicated location computation circuitry which uses the location signal detection information to provide an estimate of an indicated position of the pointing device in the projected display. And, optical mouse indicated location computation circuitry is provided that uses the estimate of the indicated position from the projected display indicated location computation circuitry and the relative motion information from the optical mouse circuitry to provide coordinates of the indicated location to the projector.

The optical mouse indicated location computation circuitry may provide the coordinates of the indicated location to the projector in every frame of the projected display. The optical mouse indicated location computation circuitry may provide the coordinates of the indicated location multiple times per frame in successive frames to the projector. The pointing device may further include at least one mouse button, and button circuitry that provides mouse button status information to the transmit circuitry.

In the described interactive display projection system, the projected display indicated location computation circuitry and the optical mouse indicated location computation circuitry may be located in the pointing device. The projected display indicated location computation circuitry may provide the estimate of the indicated position to the optical mouse indicated location computation circuitry. The optical mouse indicated location computation circuitry may provide the coordinates of the indicated location to the transmit circuitry. And, the transmit circuitry may send the coordinates of the indicated location to the projector through the transmitter. The projected display indicated location computation circuitry and the optical mouse indicated location computation circuitry may be located at the projector. The projected display location signal processing circuitry may provide the location signal detection information to the transmit circuitry; the optical mouse circuitry may provide the relative motion information to the transmit circuitry; and the transmit circuitry may send the location signal detection information and the relative motion information to the projector through the transmitting means. The projector of the interactive display projection system may, for example, be a front projector, a rear projector, or a horizontal short throw projector.

DETAILED DESCRIPTION OF EXAMPLE EMBODIMENTS

An interactive display projection system which provides a projected display may include a pointing device. A projector of the display projection system provides a location signal in the projected display, which is captured by circuitry in the pointing device. Projected display indicated location computation circuitry uses the location signal in the display captured by the pointing device to provide an estimate of an indicated location of the pointing device on the projected display, herein referred to as the indicated location. The projected display indicated location computation circuitry may be located, for example, in the pointing device or at the projector. The display projection system determines the indicated location on the projected display using a combination of a location signal in the display captured by the pointing device and at least optical mouse optoelectronic elements and circuitry.

The optical mouse circuitry in the pointing device may determine relative motion of the pointing device when the pointing device is close to the projected display. Optical mouse indicated location computation circuitry uses relative motion information from the optical mouse circuitry and information from the projected display indicated location computation circuitry to determine an indicated position of the pointing device. The optical mouse indicated location computation circuitry may be located in the pointing device or at a projector of the display projection system.

In a further embodiment, an inertial sensor and associated inertial sensor circuitry may be included in the pointing device. The inertial sensor may detect linear accelerations and rotational rates along two or three axes. The associated inertial sensor circuitry may determine relative motion and orientation of the pointing device. Inertial sensor indicated location computation circuitry may use relative motion and orientation information from the inertial sensor circuitry and information from the projected display indicated location computation circuitry to determine an indicated position of the pointing device. The inertial sensor indicated location computation circuitry may be located in the pointing device or at the projector.

The pointing device includes transmit circuitry and a transmitting means to send information from the other motion-determining mechanism, possibly including coordinates of the indicated location, to the projector. The pointing device may also include mouse button functionality.

Figure 1:
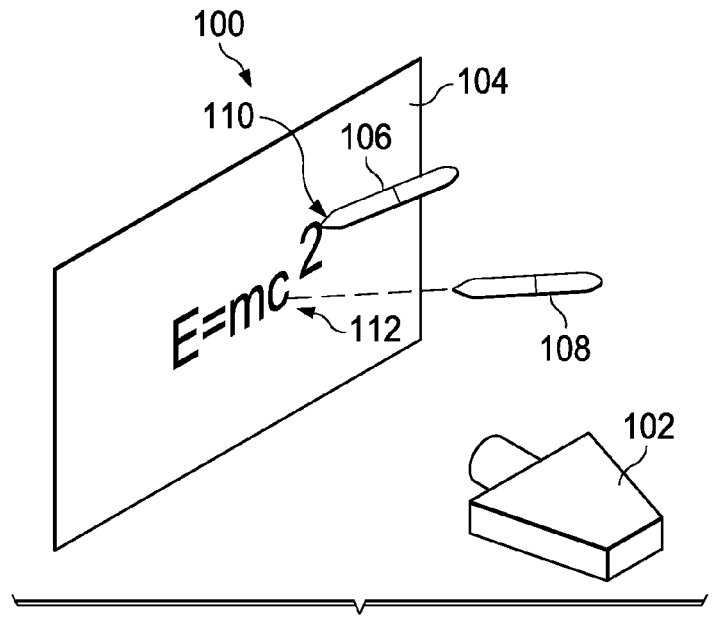
FIG. 1 is an interactive display projection system formed according to an embodiment.

FIG. 1 is an interactive display projection system formed according to an embodiment. The display projection system 100 includes a projector which may be a front projector 102 as depicted in FIG. 1. The projector 102 provides a projected display 104. The projected display 104 may be on a vertical opaque screen or an area of a wall. The front projector 102 may be an overhead projector as depicted in FIG. 1, possibly attached to a ceiling, or may be a portable tabletop projector.

The display projection system 100 includes a pointing device 106 or 108 which is used to generate an indicated position 110 or 112 on the projected display 104. The projector 102 provides a location signal in the projected display 104 which is detected by the pointing device 106 or 108. Detection information from the pointing device 106 or 108 corresponding to the detected location signal is provided to projected display indicated location computation circuitry, not shown, which determines an estimate of an indicated position 110 or 112 of the pointing device on the projected display 104. The projected display indicated location computation circuitry may be located, for example, in the pointing device 106 or 108, or at the projector 102. An example of use of the location signal is Point Blank™ technology from Texas Instruments, Inc. The display projection system determines an indicated location 110 or 112 on the projected display indicated by the pointing device 106 or 108 using a combination of a location signal in the display captured by the pointing device 108 or 110 and at least optical mouse optoelectronic elements and circuitry, which may allow the display projection system 100 to update the indicated position 110 or 112 in every frame of the projected display 104, or possibly multiple times in successive frames. The optical mouse circuitry provides relative motion information to optical mouse indicated location computation circuitry, not shown, when the pointing device 106 is close to the projected display 104. The optical mouse indicated location computation circuitry uses relative motion information from the optical mouse circuitry and information from the projected display indicated location computation circuitry to determine the indicated position 110. The optical mouse indicated location computation circuitry may be located, for example, in the pointing device 106 or at the projector 102. In one version of the instant embodiment, the optical mouse circuitry may provide sufficiently accurate information on motion of the pointing device 106 to update the indicated position 110 in every frame of the projected display 104 when the pointing device 106 is within, for example, 10 mm of the projected display 104, including being in direct contact with the projected display 104. In another version of the instant embodiment, the optical mouse circuitry may provide sufficiently accurate information on motion of the pointing device 106 to update the indicated position 110 multiple times per frame in successive frames of the projected display 104. The optical mouse circuitry may provide the motion information to the display projection system 100 when the location signal in the projected display 104 is temporarily unavailable, for example when the projected display 104 is optically blocked, such as by a user of the display projection system 100 or an observer.

In a further version of the instant embodiment, the pointing device 108 may also include inertial sensors and associated inertial sensor circuitry which provides relative motion and orientation information to inertial sensor indicated location computation circuitry, not shown, in addition to the optical mouse optoelectronic elements and circuitry. The inertial sensor indicated location computation circuitry may provide the motion and orientation information when the pointing device 108 is remote from the projected display 104, so that the optical mouse circuitry is unable to provide desired motion information. The inertial sensors and inertial sensor circuitry may provide sufficiently accurate information on motion and orientation of the pointing device 108 to update the indicated position 112 in every frame of the projected display 104, or possibly multiple times per frame in successive frames. The inertial sensors and inertial sensor circuitry may also provide the motion and orientation information to the display projection system 100 when the projected display 104 is temporarily unavailable.

The pointing device 106 or 108 may also include mouse button functionality, for example one or two buttons and possibly a scroll wheel. Mouse button circuitry in the pointing device 106 or 108 provides status information on the mouse buttons and scroll wheel to the display projection system 100.

Figure 2:
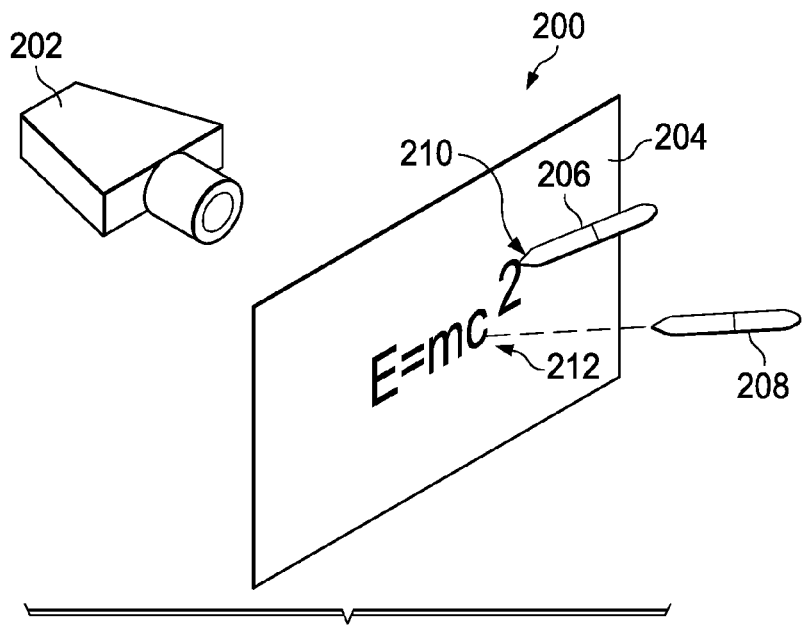
FIG. 2 is an interactive display projection system formed according to another embodiment.

FIG. 2 is an interactive display projection system formed according to another embodiment. The display projection system 200 includes a projector which may be a rear projector 202 as depicted in FIG. 2. The projector 202 provides a projected display 204. The projected display 204 may be on a vertical optically transmissive screen, for example in a rear projection television set. The display projection system 200 includes a pointing device 206 or 208 which is used to generate an indicated position 210 or 212 on the projected display 204, as described in reference to FIG. 1. The projector 202 provides a location signal in the projected display 204 which is detected by the pointing device 206 or 208. The pointing device 206 or 208 includes optical mouse optoelectronic elements and circuitry, as described in reference to FIG. 1. In one version of the instant embodiment, the pointing device 206 or 208 may also include inertial sensors and associated inertial sensor circuitry, as described in reference to FIG. 1.

Figure 3:
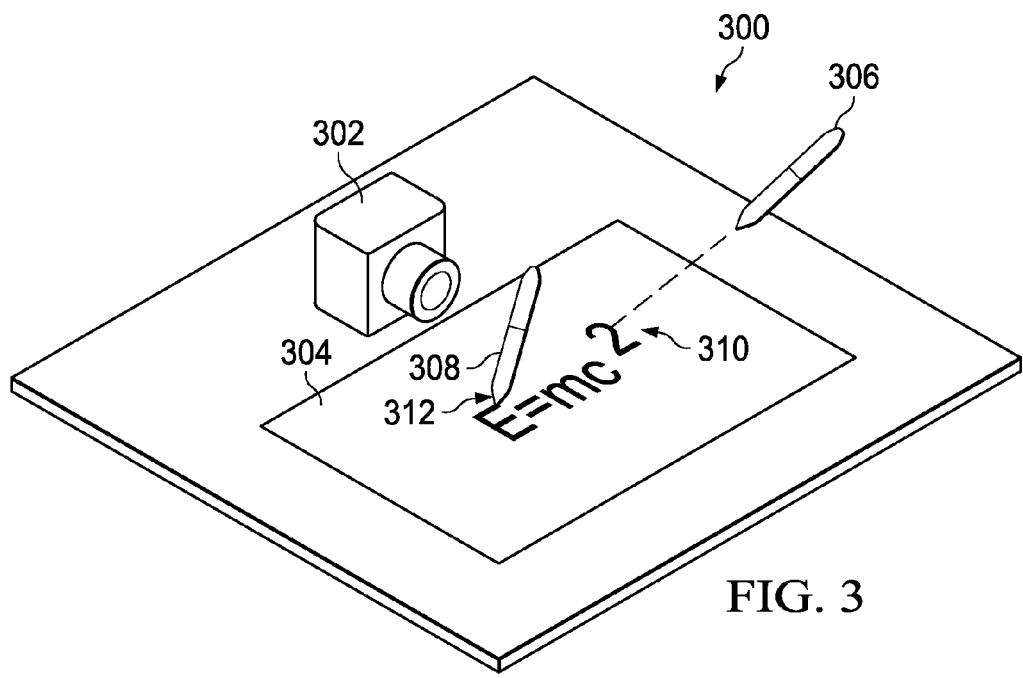
FIG. 3 is an interactive display projection system formed according to a further embodiment.

FIG. 3 is an interactive display projection system formed according to a further embodiment. The display projection system 300 includes a projector which may be a horizontal short throw projector 302 as depicted in FIG. 3. The projector 302 provides a projected display 304. The projected display 304 may be on a horizontal surface, for example a desktop or tabletop. The display projection system 300 includes a pointing device 306 or 308 which is used to generate an indicated position 310 or 312 on the projected display 304, as described in reference to FIG. 1. The projector 302 provides a location signal in the projected display 304 which is detected by the pointing device 306 or 308. The pointing device 306 or 308 includes optical mouse optoelectronic elements and circuitry, as described in reference to FIG. 1. In one version of the instant embodiment, the pointing device 306 or 308 may also include inertial sensors and associated inertial sensor circuitry, as described in reference to FIG. 1.

Figure 4:
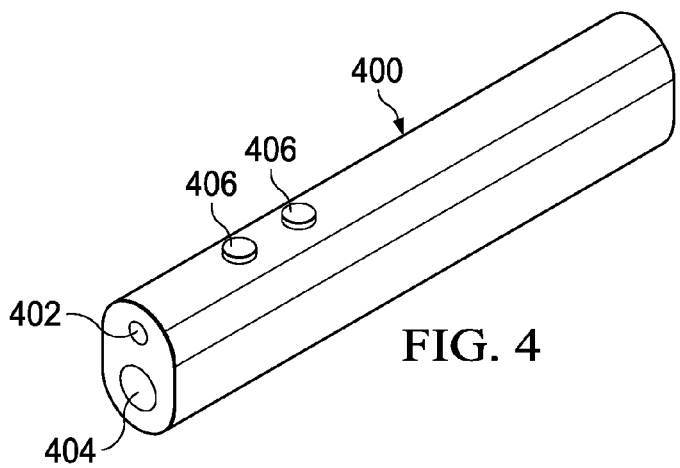
FIGS. 4 and 5 are perspective views of pointing devices formed according to embodiments.
Figure 5:
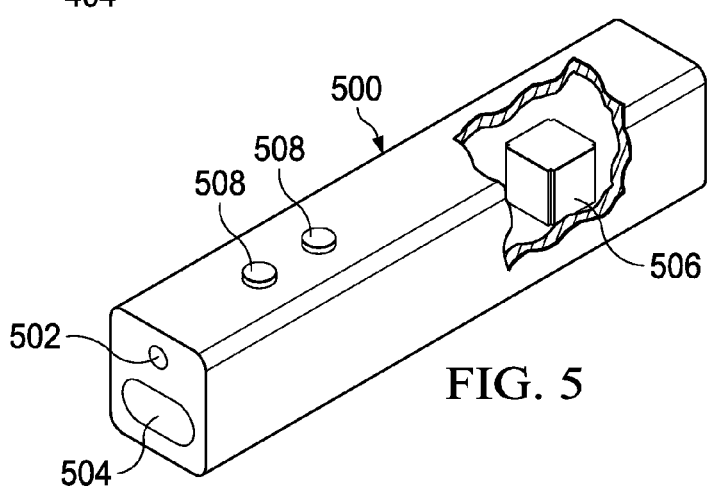

FIGS. 4 and 5 are perspective views of pointing devices formed according to embodiments. In FIG. 4, a first pointing device 200 has a first optical aperture 402 for receiving a location signal in a projected display, as discussed in reference to FIG. 1 through FIG. 3, and projected display location signal processing circuitry, not shown. The pointing device 400 also has a second optical aperture 404 for optical mouse circuitry, not shown. The pointing device 400 may also have one or more optional mouse buttons 406.

In FIG. 5, a second pointing device 500 has a first optical aperture 502 for receiving a location signal in a projected display, projected display location signal processing circuitry, not shown, and a second optical aperture 504 for optical mouse circuitry, not shown. The pointing device 500 also has an inertial sensor 506 and associated inertial sensor circuitry, not shown. The pointing device 500 may also have one or more optional mouse buttons 508.

Figure 6:
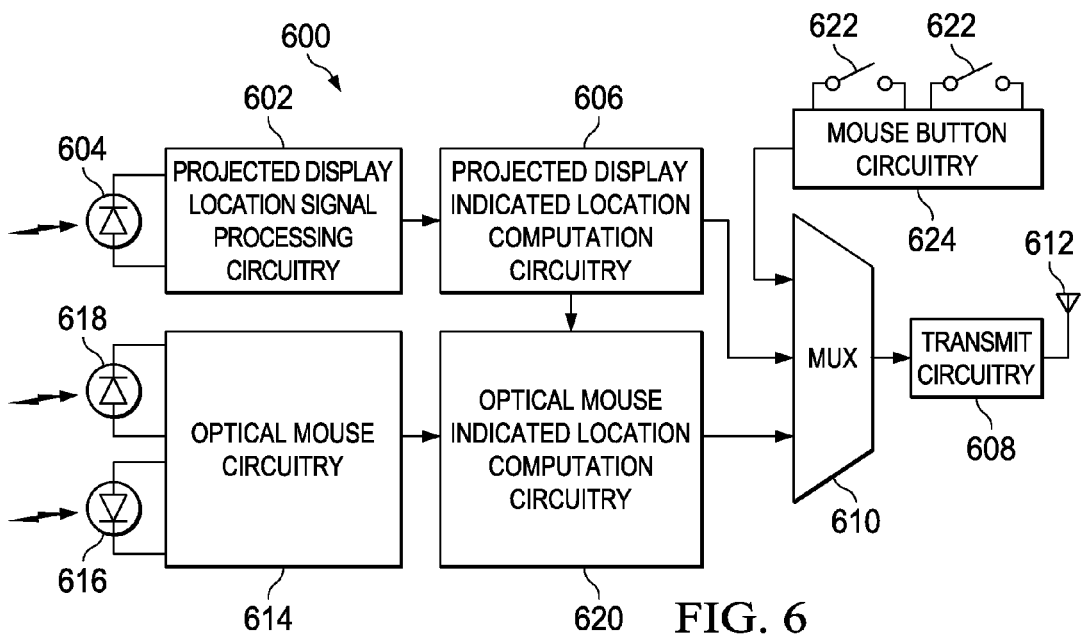
FIGS. 6 and 7 are schematic views of the pointing devices depicted in FIGS. 4 and 5.
Figure 7:
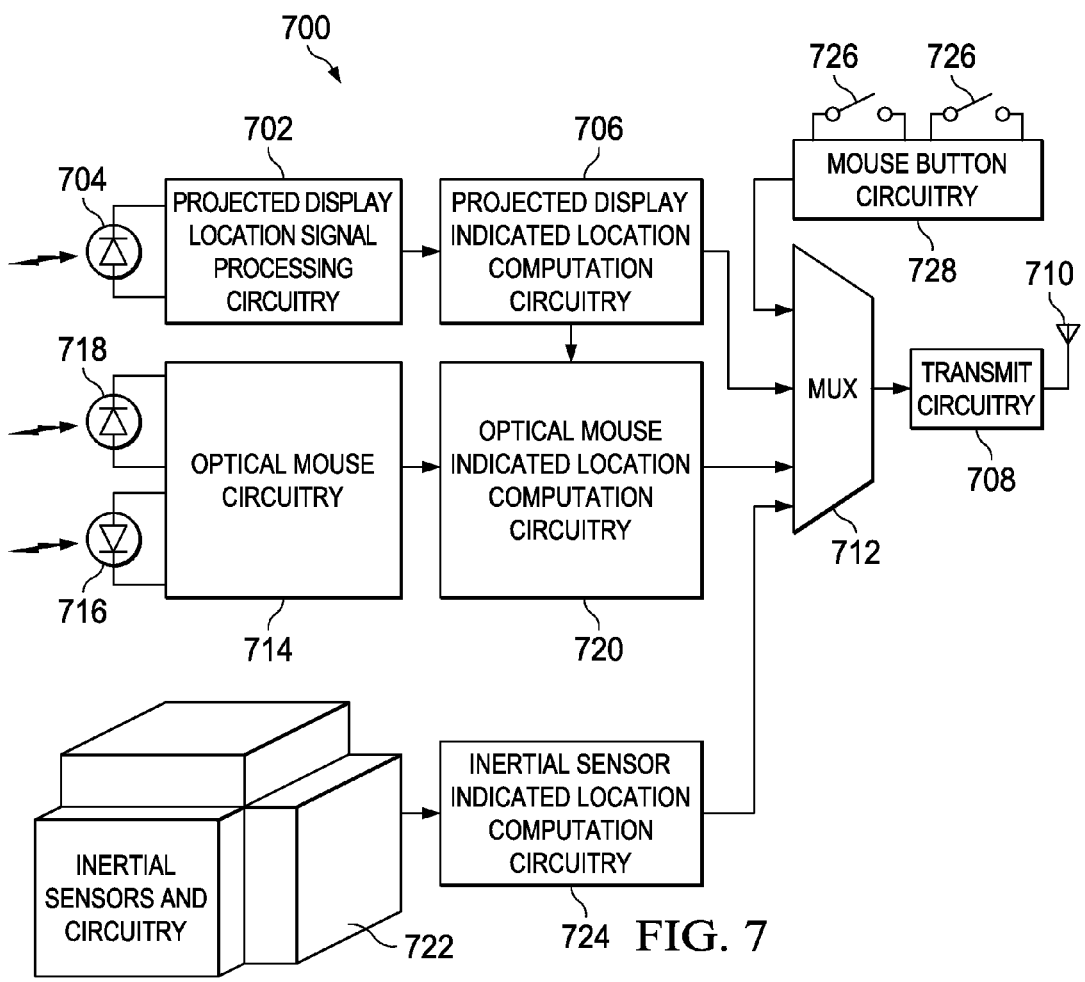

FIGS. 6 and 7 are schematic views of the pointing devices depicted in FIGS. 4 and 5, respectively. Referring to FIG. 6, the first pointing device 600 includes projected display location signal processing circuitry 602 connected to a location signal sensor 604. Detection information from the projected display location signal processing circuitry 602 is provided to projected display indicated location computation circuitry 606, which may be located in the pointing device 600 as depicted in FIG. 6, or may be located elsewhere, for example at a projector of a display projection system which includes the pointing device 600. The projected display indicated location computation circuitry 606 provides an estimate of an indicated position. In versions of the instant embodiment in which the projected display indicated location computation circuitry 606 is located in the pointing device 600, the estimate of the indicated position is provided to transmit circuitry 608, possibly through a multiplexer 610. The transmit circuitry 608 sends the estimate of the indicated position to the display projection system by a transmitting means 612. The transmit circuitry 608 and transmitting means 612 may comprise, for example, a radio transmitter, an infrared optical transmitter, an ultrasonic acoustic transmitter, a fiber optic transmitter, or a wired signal transmitter. Other forms of the transmit circuitry 608 and transmitting means 612 are within the scope of the instant embodiment. In versions of the instant embodiment in which the projected display indicated location computation circuitry 606 is not located in the pointing device 600, the projected display location signal processing circuitry 602 provides detection information to the transmit circuitry 608 which sends the detection information to the projected display indicated location computation circuitry 606.

The pointing device 600 includes optical mouse circuitry 614 connected to an optical mouse emitter 616 and an optical mouse detector 618. Motion information from the optical mouse circuitry 614 and the estimate of the indicated position from the projected display indicated location computation circuitry 606 are provided to optical mouse indicated location computation circuitry 620, which may be located in the pointing device 600 as depicted in FIG. 6, or may be located elsewhere, for example at the projector. The optical mouse indicated location computation circuitry 620 provides coordinates of the indicated position. In versions of the instant embodiment in which the optical mouse indicated location computation circuitry 620 is located in the pointing device 600, the coordinates of the indicated position are provided to the transmit circuitry 608, possibly through the multiplexer 610. The transmit circuitry 608 sends the coordinates of the indicated position to the display projection system through the transmitting means 612. In versions of the instant embodiment in which the optical mouse indicated location computation circuitry 620 is not located in the pointing device 600, the optical mouse circuitry 614 provides relative motion information to the transmit circuitry 608 which sends the relative motion information to the optical mouse indicated location computation circuitry 620.

The pointing device 600 may include one or more optional mouse buttons 622 with associated mouse button circuitry 624. Mouse button status information is provided from the mouse button circuitry 624 to the transmit circuitry 608 and on to the display projection system.

In FIG. 7, the third pointing device 700 includes projected display location signal processing circuitry 702 connected to a location signal sensor 704, and possibly projected display indicated location computation circuitry 706. Information from the projected display location signal processing circuitry 702 and projected display indicated location computation circuitry 706, if present in the pointing device 700, is processed as described in reference to FIG. 6. The pointing device 700 includes transmit circuitry 708, transmitting means 710 and possibly a multiplexer 712 as described with reference to FIG. 6.

The pointing device 700 includes optical mouse circuitry 714 connected to an optical mouse emitter 716 and detector 718, and possibly optical mouse indicated location computation circuitry 720. Information from the projected optical mouse circuitry 714 and optical mouse indicated location computation circuitry 720, if present in the pointing device 700, is processed as described with reference to FIG. 6.

The pointing device 700 also includes inertial sensors and inertial sensor circuitry 722. Linear acceleration and rotational rate information along two or three axes from the inertial sensors and inertial sensor circuitry 722 and the estimated of the indicated position from the projected display indicated location computation circuitry 706 are provided to inertial sensor indicated location computation circuitry 724, which may be located in the pointing device 700 as depicted in FIG. 7, or may be located elsewhere, for example at the projector. The inertial sensor indicated location computation circuitry 724 provides coordinates of the indicated position. In versions of the instant embodiment in which the inertial sensor indicated location computation circuitry 724 is located in the pointing device 700, the coordinates of the indicated position are provided to the transmit circuitry 708, possibly through the multiplexer 712. The transmit circuitry 708 sends the coordinates of the indicated position to the display projection system through the transmitting means 710. In versions of the instant embodiment in which the inertial sensor indicated location computation circuitry 724 is not located in the pointing device 700, the inertial sensor sensors and circuitry 722 provides linear acceleration and rotational rate information to the transmit circuitry 708 which sends the linear acceleration and rotational rate information to the inertial sensor indicated location computation circuitry 724.

The pointing device 700 may include one or more optional mouse buttons 726 with associated mouse button circuitry 728. Mouse button status information is provided from the mouse button circuitry 728 to the transmit circuitry 708 and on to the display projection system.

Those skilled in the art to which the invention relates will appreciate that modifications may be made to the described example embodiments and other embodiments realized within the scope of the claimed invention.

What is claimed is:

1. An interactive image display projection system, comprising:
    a projector for displaying an image including a location signal from a remote location onto a target display surface;
    a pointing device, the pointing device including:
        a displayed location signal sensor for detecting the displayed location signal;
        first signal processing circuitry coupled to the displayed location signal sensor for providing location information based on the detected location signal;
        an emitter for emitting an optical signal from close proximity onto the target display surface;
        a detector for detecting reflection of the emitted optical signal when the pointing device is within the close proximity;
        second signal processing circuitry coupled to the detector for providing information on relative motion of the pointing device based on the detected reflection; and
        transmitting circuitry coupled to the first signal processing circuitry and the second signal processing circuitry for transmitting to the projector at least one of a) the location information and relative motion information or b) information derived from the location information and relative motion information; and
    pointer location computation circuitry for determining a point on the image pointed to by the pointing device, the point determined from the location information and relative motion information.

2. The system of claim 1, further comprising control circuitry for controlling projection of the displayed image to include displayed information responsive to the determined point.

3. The system of claim 2, wherein the displayed information is a displayed cursor image.

4. The system of claim 2, wherein the point location computation circuitry determines coordinates of the point on the image, using a combination of last detected location signal information and relative motion information of the pointing device in contact with the target display surface.

5. The system of claim 4, in which the pointer location computation circuitry determines coordinates of the point in every frame of multiple frames of the projected image.

6. The system of claim 5, in which the pointer location computation circuitry determines the coordinates of the point multiple times per frame in successive frames or the projected image.

7. The system of claim 5, wherein the pointing device further includes a manually operated switch for activating at least one of the emitter and detector, and the transmitting circuitry further transmits the status of the switch to the projector.

8. The system of claim 5, wherein the pointer location computation circuitry is located in the pointer device, and the transmitting circuitry transmits information on coordinates of the point to the projector.

9. The system of claim 5, wherein the pointer location computation circuitry is located in the projector, and the transmitting circuitry transmits the location information and the relative motion information to the projector.

10. The system of claim 1, wherein the pointing device further comprises an inertial sensor for detecting motion along at least two axes of the pointing device, and third signal processing circuitry coupled to the inertial sensor for providing linear acceleration and rotational rate information based on the detected motion; the transmitting circuitry is coupled to the third signal processing circuitry for also transmitting to the projector information at least one of a) the linear acceleration and rotational rate information or b) information derived form the linear acceleration and rotational rate information; and the pointer location computation circuitry includes circuitry for determining the point from the location information, the relative motion information, the linear acceleration and the rotational rate information.

11. The system of claim 1, wherein the point location computation circuitry determines coordinates of the point on the image, using a combination of last detected location signal information and relative motion information of the pointing device in contact with the target display surface.

12. The system of claim 11, in which the pointer location computation circuitry determines coordinates of the point in every frame of multiple frames of the projected image.

13. The system of claim 11, in which the pointer location computation circuitry determines the coordinates of the point multiple times per frame in successive frames or the projected image.

14. The system of claim 1, wherein the pointing device further includes a manually operated switch for activating at least one of the emitter and detector, and the transmitting circuitry further transmits the status of the switch to the projector.

15. The system of claim 1, wherein the pointer location computation circuitry is located in the pointer device, and the transmitting circuitry transmits information on coordinates of the point to the projector.

16. The system of claim 1, wherein the pointer location computation circuitry is located in the projector, and the transmitting circuitry transmits the location information and the relative motion information to the projector.

* * * * *